(12) United States Patent
Zawodny et al.

(10) Patent No.: US 6,325,555 B1
(45) Date of Patent: Dec. 4, 2001

(54) CAMERA WITH EXTERNAL COMBINED CRANK AND KEY FOR FILM PRE-WINDING AND LIMITING REMOVAL AND RELOADING OF FILM AND METHOD OF ACCOMPLISHING SAME

(75) Inventors: Arthur Zawodny, Harbor Plaza Resort; Franco Yik Kai Chung, Yuen Long, both of (HK)

(73) Assignee: Concord Camera Corp., Hollywood, FL (US)

( * ) Notice: Subject to any disclaimer, the term of this patent is extended or adjusted under 35 U.S.C. 154(b) by 0 days.

(21) Appl. No.: 09/521,048

(22) Filed: Mar. 8, 2000

(51) Int. Cl.[7] ............... G03B 1/00; G03B 17/02
(52) U.S. Cl. ............ 396/411; 396/387; 396/536
(58) Field of Search ............... 396/6, 387, 388, 396/407, 411, 413, 535, 536, 538

(56) References Cited

U.S. PATENT DOCUMENTS

| | | | |
|---|---|---|---|
| 3,096,699 | * | 7/1963 | Harvey et al. ............ 396/411 |
| 5,708,856 | * | 1/1998 | Cloutier ............ 396/6 |
| 5,752,085 | * | 5/1998 | Cloutier et al. ............ 396/6 |
| 6,049,675 | * | 4/2000 | DiRisio et al. ............ 396/6 |

* cited by examiner

*Primary Examiner*—Alan A. Mathews
(74) *Attorney, Agent, or Firm*—Scott Lampert

(57) ABSTRACT

A camera having means for pre-winding unexposed film, in non-darkroom conditions from a film cartridge to a take up spool and limiting removal and replacement of the film cartridge to those designated to do. A latching member includes a pair of slots structured to slidingly engage a pair of guide pins disposed on the main body side wall and a pair of hooks structured to matingly engage a pair of hooks extending out from the rear door to prevent the camera door from being opened. A pair of outwardly biased locking pins, extending out from the main body side wall, are structured for movement from a first extended position, wherein the pins extend through a pair of corresponding holes in the latching member, thereby retaining the latching member in a first upper, locking position, to a second depressed position, wherein the latching member may be slid downward to a second lower, unlocking position, thereby permitting the rear door to be opened. An external tool includes a pair of pins structured to depress the locking pins into the second depressed position so that the latching member may be slid into the lower position, and a generally circular-shaped rim, with at least one inwardly disposed tab, extending out from its bottom face, structured to mate with a corresponding shaped structure on the outer end of the take-up spool to facilitate the pre-winding of the unexposed film.

24 Claims, 3 Drawing Sheets

CAMERA WITH EXTERNAL COMBINED CRANK AND KEY FOR FILM PRE-WINDING AND LIMITING REMOVAL AND RELOADING OF FILM AND METHOD OF ACCOMPLISHING SAME

The present invention relates to cameras and, more particularly, to a camera having means for pre-winding unexposed film from a film cartridge loaded in the camera to a take-up spool in the camera in a non-darkroom environment and locking means to limit removal and replacement of the film cartridge. The present invention further relates to a method for accomplishing such pre-winding and locking.

BACKGROUND

Customer loyalty is a desired objective of all businesses. As such, businesses are continuously searching for ways to keep their customers coming back. For businesses in highly competitive industries, customer loyalty is often vital to the success of the business.

However, for businesses which mainly sell common consumable products, this is a particularly difficult problem. In such industries, price is often the force driving customer purchases and, consequently, customer loyalty tends to be low. Accordingly, businesses in these industries are particularly interested in means for generating repeat business.

One means of accomplishing this is to provide a consumable product which cannot be replenished by others. However, as stated previously, this is particularly difficult to accomplish when dealing with common consumables. For instance, film processing services are widely available and, for the most part, are virtually indistinguishable from one business to another. Thus, consumers tend to choose film processing services based on price. Accordingly, film processing services are constantly searching for means to guide consumers back into their stores.

One such device developed to address this need is shown in U.S. Pat. No. 5,752,085 to Cloutier. Cloutier discloses a rental camera having an auxiliary key structured to open the film and battery reloading doors and to initiate the camera rewind mechanism. Although somewhat useful for its intended purpose, the Cloutier camera includes certain inherent limitations which limit its overall effectiveness. First, the Cloutier locking mechanism includes a fairly specific and complicated structure, which is not easily adaptable to existing camera configurations.

Additionally, many cameras are structured so that the unexposed film is pre-wound from a film cartridge loaded in the camera onto a take-up spool in the camera, with the exposed film being fed back into the cartridge as pictures are taken. Cloutier does not include means for such pre-winding. In fact, the Cloutier camera is specifically designed for rewinding after the film has been exposed and, accordingly, does not contemplate use with such pre-winding systems. Moreover, it is often desirable for such pre-wind cameras to include means for pre-winding in non-darkroom conditions so that film may be readily loaded and pre-wound at any location and in any ambient conditions. This is especially desirable for so-called "rental" cameras like that disclosed in Cloutier, which will, typically, be reloaded in a film processing store, while the consumer awaits the return of the reloaded camera.

Accordingly, there is still a need in the art for a system for cameras of the type structured for film pre-winding, which includes means for pre-winding the unexposed film in non-darkroom conditions and locking means for limiting the ability to remove and replace film to those having the proper key. Any such system should include a single tool for accomplishing both the pre-winding and unlocking functions. Any such system should also be easily adaptable to existing camera structures and easy to operate. The present invention is particularly suited to overcome those problems which remain in the art in a manner not previously known.

SUMMARY OF THE INVENTION

The present invention is directed towards a new and improved camera having means for pre-winding unexposed film, in non-darkroom conditions, from a film cartridge to a take up spool and limiting removal and replacement of the film cartridge to those designated to do so. The camera includes a main body and rear door structured to mate with one another to form a light-tight casing. The rear door provides access to a film cartridge receiving compartment, a substantially cylindrical-shaped take-up spool and battery compartment disposed within the spool. The take-up spool includes an outer end zone extending through the top face of the main body, so as to be accessible exteriorly of the camera, and is structured to rotate within the camera about an axis perpendicular to the optical axis of the camera. A locking mechanism secures the rear door to the main body to prevent the rear door from being opened. The locking mechanism comprises a latching member having upper and lower slots structured to slidingly engage a pair of upper and lower guide pins disposed on a side wall of the main body and upper and lower hooks structured to matingly engage a pair of upper and lower hooks extending tangently out from a side wall of the rear door. A pair of outwardly biased locking pins, extending through and out from the side wall of the main body, are structured and disposed for inward and outward movement from a first extended position, wherein the pins extend through a pair of corresponding holes in the latching member, thereby retaining the latching member in a first upper position, to a second depressed position, wherein the latching member may be slid downward to a second lower position, thereby permitting the rear door to be opened. The latching member further includes a generally s-shaped, resilient biasing member seated above a generally horizontally disposed bar extending out from the side wall of the main body, structured to compress against the bar when the latching member is in the second lower position and force the latching member back into the first upper position. An external tool includes a pair of pins, structured to depress the locking pins into the second depressed position so that the latching member may be slid into the second lower position and the rear door opened, and a generally circular-shaped rim, with at least one inwardly disposed tab, extending out from its bottom face, structured to mate with a corresponding shaped structure on the outer end of the take-up spool to facilitate the pre-winding of the unexposed film.

It is an object of the present invention to provide a new and improved camera having all of the advantages of the prior art and none of the disadvantages.

It is another object of the present invention to provide a camera which includes means for pre-winding unexposed film from a film cartridge loaded in the camera to a spool in the camera in non-darkroom conditions and locking means for limiting the ability to remove and replace the film cartridge.

It is also an object of the present invention to provide such a camera which includes a single tool for accomplishing both the pre-winding and unlocking functions.

It is a further object of the present invention to provide such a system for a camera which is easily adaptable to existing camera structures.

It is yet another object of the present invention to provide such a system which is easy to operate.

These and other objects and advantages of the present invention will become more apparent in the description which follows.

BRIEF DESCRIPTION OF THE DRAWINGS

For a fuller understanding of the nature of the present invention, reference should be had to the following detailed description, taken in connection with the accompanying drawings in which.

DETAILED DESCRIPTION OF THE PREFERRED EMBODIMENT

Figure 1:
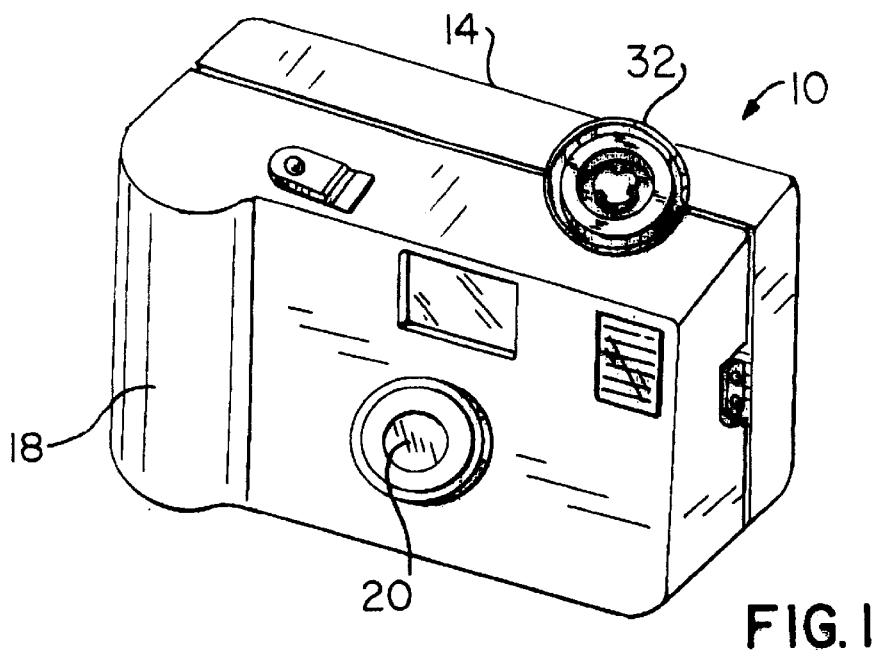
FIG. 1 is a perspective view of the camera of the present invention.

Before explaining the disclosed embodiment of the present invention in detail, it is to be understood that the invention is not limited in its application to the details of the particular arrangement shown since the invention is capable of other embodiments. Also, the terminology used herein is for the purpose of description and not of limitation.

Referring to FIGS. 1–8, the present invention is directed towards a new and improved camera 10 having means for pre-winding unexposed film, in non-darkroom conditions, from a film cartridge to a take up spool and limiting removal and replacement of the film cartridge to those designated to do so. The camera 10 of the present invention is of the type having a main body 12 with a taking lens 20, a film cartridge receiving compartment (not shown) disposed on one side of the taking lens 20 and a take-up spool (not shown) disposed on the opposite side of the taking lens 20, whereby the camera is structured for pre-winding of unexposed film from a film cartridge seated in the film cartridge receiving compartment to the take-up spool prior to use and then winding the exposed film back into the film cartridge, frame by frame, as pictures are taken.

The camera 10 includes a rear door 14 structured to mate with the main body 12 and provide access to the film cartridge receiving compartment and take-up spool. A battery compartment, accessible via a battery compartment door disposed beneath the main body 12, is disposed within the take-up spool for flash units. The main body 12 and rear door 14 are structured to form a light-tight casing. A front cover 18 is structured to mate with the main body 12 and rear door 14.

The take-up spool is substantially cylindrical shaped and is structured to rotate within the camera 10 about an axis perpendicular to the optical axis of the camera 10. The take-up spool includes a tab to mate with one of the holes along the periphery of the leading edge of the film so as to pull the unexposed film out of the film cartridge as the spool is rotated during pre-winding. It should be appreciated that other film engaging means known in the art may be employed to retain the leading edge of the film about the take-up spool.

The take-up spool includes an outer end zone 32, which extends through the top face of the main body 12, the front cover 18 and rear door 14 when they are mounted to the main body 12, so as to be accessible exteriorly of the camera 10. Rotation of the take-up spool and attached film during pre-winding may be accomplished by grasping and rotating the outer end zone 32 of the take-up spool exteriorly of the camera 10. It should be appreciated that the outer end zone 32 of the take-up spool may, alternatively, extend through the bottom face of the main body 12, the front cover 18 and rear door 14.

Figure 2:
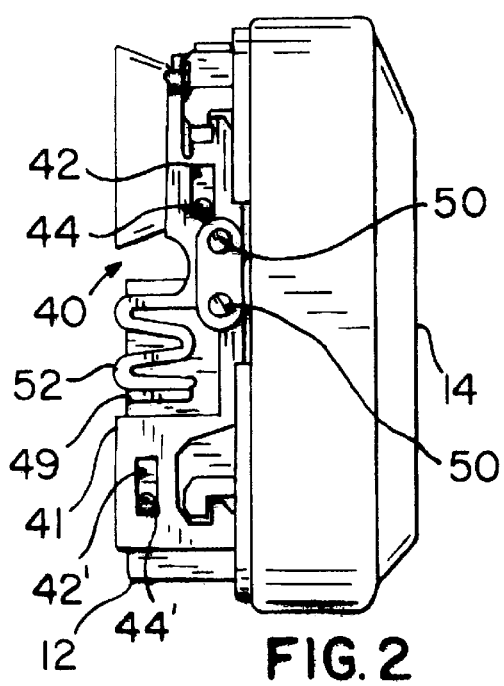
FIG. 2 is a side elevation view of the camera of the present invention with the front cover removed.
Figure 5:
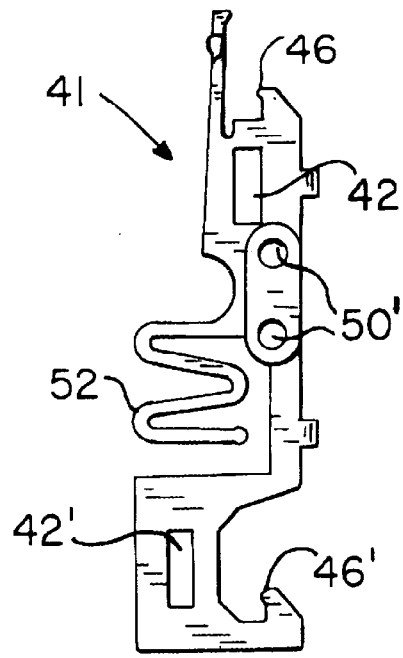
FIG. 5 is a top plan view of the latching member.
Figure 4:
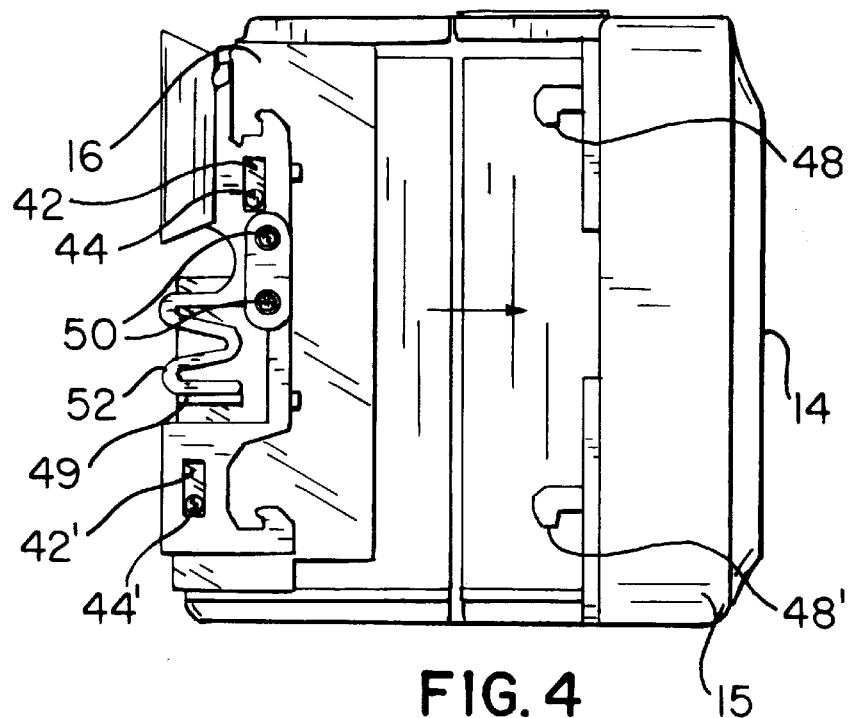
FIG. 4 is a side elevation view of the camera of the present invention showing the rear door unlatched from the latching member.
Figure 3:
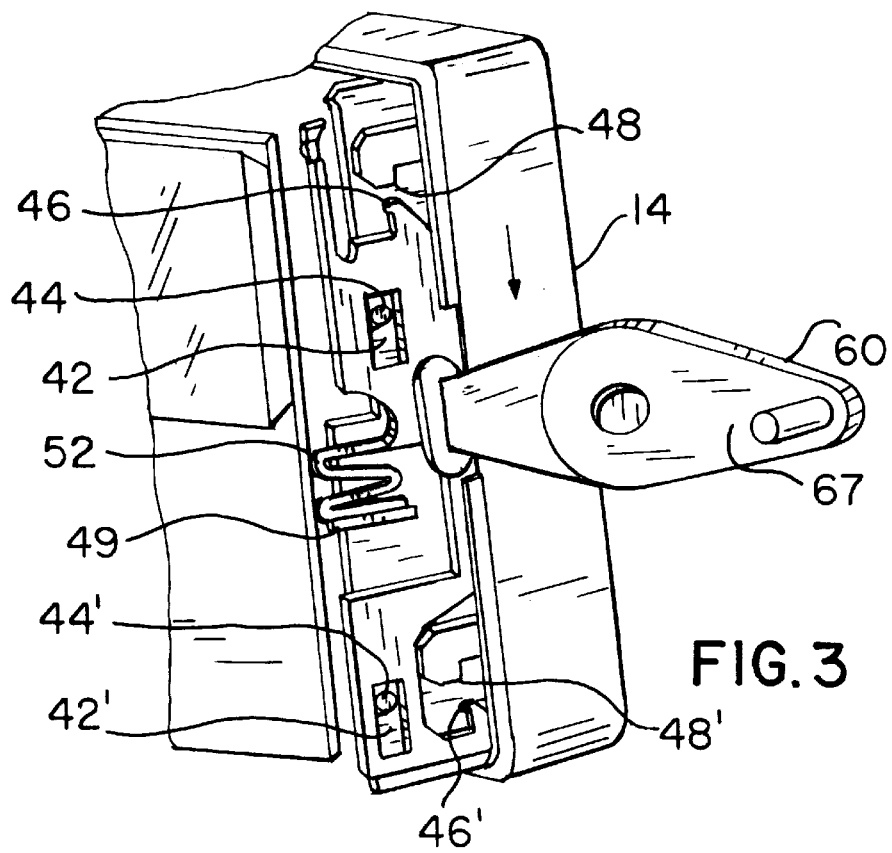
FIG. 3 is a perspective view of the camera with the front cover removed showing the external tool pins inserted in the latching member holes and the latching member in the second lower position.
Figure 6:
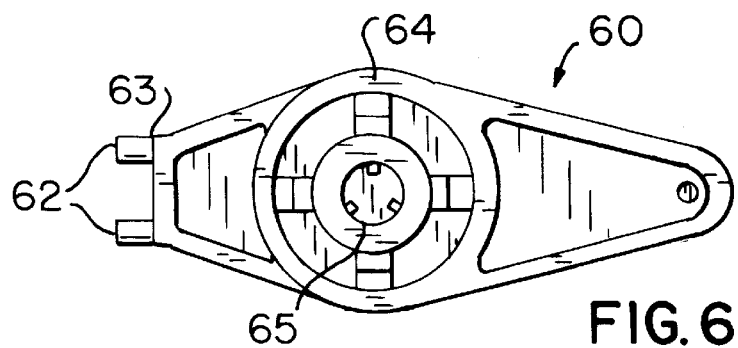
FIG. 6 is a bottom plan view of the external tool.
Figure 7:
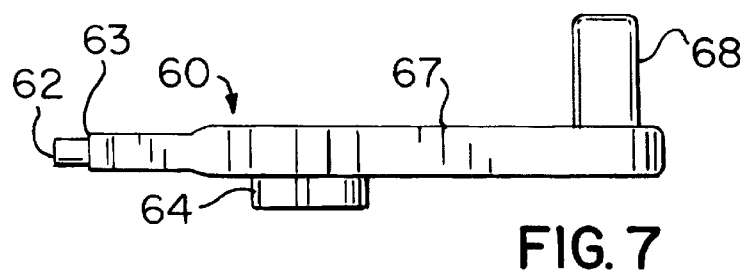
FIG. 7 is a side elevation view of the external tool.
Figure 8:
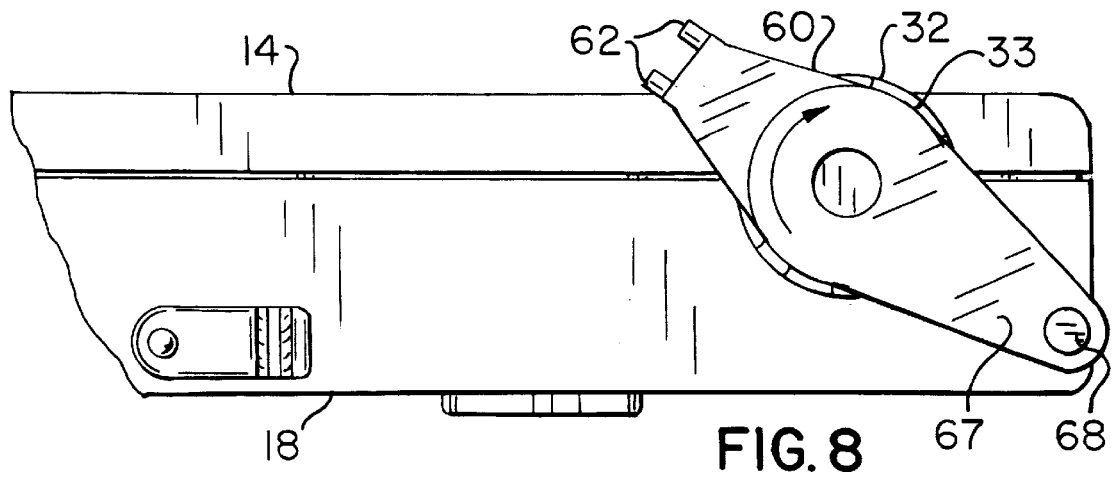
FIG. 8 is a top plan view of the camera showing the external tool in mating engagement with the outer end of the take-up spool for film pre-winding. Like reference numerals refer to like parts throughout the several views of the drawings

A locking mechanism 40 secures the rear door 14 to the main body to prevent the rear door 14 from being opened and the film cartridge and battery from being removed. The locking mechanism 40 comprises a latching member 41 having upper and lower slots 42, 42' structured to slidingly engage a pair of tipper and lower guide pins 44, 44' disposed on a side wall 16 of the main body 12. The guide pins 44, 44' and slots 42, 42' permit the latching member 41 to slide from a first upper position, wherein the guide pins 44, 44' arc positioned at the lowermost end of the slots 42, 42' (as shown in FIGS. 2 and 4), to a second lower position, wherein the guide pins 44, 44' are positioned at the uppermost end of the slots 42, 42' (as shown in FIG. 3). The latching member 41 further includes upper and lower hooks 46, 46' structured to matingly engage a pair of upper and lower hooks 48, 48' extending tangently out from a side wall 15 of the rear door 14 when the latching member 41 is in the first upper position. Upon sliding the latching member 41 into the second lower position, the hooks 48, 48' on the rear door 14 are released from the hooks 46, 46' on the latching member 41, thereby permitting the rear door 14 to be opened.

A generally s-shaped, resilient biasing member 52 is disposed on the latching member 41, between the upper 42 and lower 42' slots. The biasing member 52 is seated above a generally horizontally disposed bar 49 disposed on the side wall 16 of the main body 12 and is structured and disposed to compress against the bar 49 when the latching member 41 is in the second lower position, thereby forcing the latching member 41 back into the first upper position. It should be appreciated that other biasing means known in the art may, alternatively, be utilized.

A pair of outwardly biased locking pins 50 extend through and out from the side wall 16 of the main body 12. The pins 50 are structured and disposed for inward and outward movement from a first extended position, wherein the pins 50 extend through a pair of corresponding holes 50' in the latching member 41, thereby retaining the latching member in the first upper position, to a second depressed position, wherein the latching member 41 may be slid downward to the second lower position, thereby permitting the rear door 14 to be opened.

An external tool 60, having a pair of pins 62 corresponding in size and shape to the holes 50' in the latching member 41 projecting out from one of its edges 63, is provided to depress the locking pins 50 into the second depressed position so that the latching member 41 may be slid into the second lower position and the rear door 14 opened. Upon removal of the pins 62 from the holes 50' of the latching member 41, the biasing member 52 forces the latching member 41 back into the first upper position, where the outwardly biased locking pins 50 will extend into the holes 50', thereby retaining the latching member 41 in the first upper position. Indicia may be provided on the top face 67 of the tool 60 to instruct the user of its proper usage to open the rear door 14.

The tool 60 also includes a generally circular-shaped rim 64, having at least one inwardly disposed tab 65, extending out from its bottom face 66. The rim 64 and tabs 65 are structured to mate with a corresponding shaped structure disposed on the outer end 33 of the outer end zone 32 of the take-up spool to facilitate the pre-winding of the unexposed film from the film cartridge to the take-up spool. It should be appreciated that other means known in the art for removably securing the tool 60 to the outer end zone 32 of the take-up spool may, alternatively, be employed. Additionally, indicia may be provided on the top face 67 of the tool 60 to instruct the user of the proper direction of rotation to pre-wind the film.

In the preferred embodiment, the tool 60 also includes a handle 68 extending out from its top face 67, in generally perpendicular relation thereto, to facilitate grasping and rotation of the tool 60 during film pre-winding.

In use, loading unexposed film into the camera of the present invention 10 is accomplished by inserting the pins 62 on the tool 60 into the holes 50' of the latching member 41 so that the locking pins 50 are pushed into the second depressed position, sliding the latching member 41 downward into the second lower position so that the hooks 48, 48' on the rear door 14 are released from the hooks 46, 46' on the latching member 41, opening the rear door 14, inserting the film cartridge into the film cartridge receiving compartment and feeding the leading edge of the unexposed film onto the take-up spool so that the tab matingly engages one of the holes along the periphery of the film. After closing the rear door 14, the film is pre-wound from the film cartridge 26 to the take-up spool by placing the tool 60 over the outer end 33 of the take-up spool and rotating the tool 60 and attached take-up spool.

After each picture is taken, a manual advance wheel is rotated, causing the exposed film to be wound, frame by frame, back into the film cartridge. After all of the film has been exposed, the film, and battery if necessary, may be removed and replaced, and the newly inserted unexposed film pre-wound, by opening the rear door 14 according to the same steps discussed above.

While the invention has been described, disclosed, illustrated and shown in various terms of certain embodiments or modifications, which it has presumed in practice, the scope of the invention is not intended to be, nor should it be deemed to be, limited thereby and such other modifications or embodiments as may be suggested by the teachings herein are particularly reserved, especially as they fall within the breadth and scope of the claims here appended.

What is claimed is:

1. A prewind camera with means for limiting removal and reloading of film comprising:
   a main body having a film cartridge receiving compartment and a take-up spool disposed on opposing sides of a film exposing area;
   a rear door hingedly attached to said main body, said rear door being structured for swinging movement from a first closed position, wherein said film cartridge receiving compartment and said take-up spool are not accessible, to a second open position, wherein said film cartridge receiving compartment and said take-up spool are accessible;
   a front face structured to mate with said main body and said rear door to form a camera enclosure;
   said take-up spool having an outer end zone extending through said camera enclosure so as to be accessible exteriorly of said camera enclosure, wherein rotation of the take-up spool during pre-winding may be accomplished by grasping and rotating said outer end zone exteriorly of said camera enclosure;
   a locking mechanism structured for movement from a first locking position, wherein said rear door is secured to said main body in said first closed position, to a second unlocking position, wherein said rear door may be swung into said second open position; and
   a tool structured to engage said lock mechanism and move said locking mechanism between said first locking position and said second unlocking position and to engage said outer end zone of said take-up spool to facilitate pre-winding of unexposed film from said film cartridge to said take-up spool.

2. The prewind camera of claim 1, wherein said locking mechanism comprises a latching member structured for sliding movement along a side wall of said main body from said first locking position to said second unlocking position.

3. The prewind camera of claim 2, wherein said latching member comprises a pair of slots, each of said slots being structured to slidingly engage a guide pin disposed on said side wall of said main body so that said latching member may slide from said first locking position, wherein said guide pins are positioned at a lowermost end of said slots, to said second unlocking position, wherein said guide pins are positioned at an uppermost end of said slots.

4. The prewind camera of claim 3, wherein said latching member further includes a pair of hooks, each of said latching member hooks being structured to matingly engage a corresponding hook extending out from said rear door when said latching member is in said first locking position, wherein sliding said latching member into said second unlocking position releases said rear door hooks from said latching member hooks, thereby permitting said rear door to be opened.

5. The prewind camera of claim 3, wherein said latching member further includes a biasing mechanism structured to force said latching member into said first locking position from said second unlocking position.

6. The prewind camera of claim 5, wherein said biasing mechanism comprises a generally s-shaped, resilient biasing, member seated above a generally horizontally disposed bar extending out from said side wall of said main body, said biasing member being structured and disposed to compress against said bar when said latching member is in said second unlocking position, thereby forcing said latching member back into said first locking position.

7. The prewind camera of claim 3, wherein said locking mechanism further comprises a pair of outwardly biased locking pins extending through and out from said side wall of said main body, said pins being structured and disposed for inward and outward movement from a first extended position, wherein said pins extend through a pair of corresponding holes in said latching member, thereby retaining said latching member in said first locking position, to a second depressed position, wherein said latching member may be slid downward to said second unlocking position, thereby permitting said rear door to be opened.

8. The prewind camera of claim 1, wherein said tool includes a generally circular-shaped rim with at least one inwardly disposed tab extending out from its bottom face, said rim and tabs being structured to mate with a corresponding shaped structure disposed on an outer end of said outer end zone of said take-up spool.

9. The prewind camera of claim 7, wherein said tool includes a pair of pins projecting out from one of its edges, said pins being structured for insertion into said holes in said latching member to depress said locking pins into said second depressed position.

10. The prewind camera of claim 8, wherein said tool further includes a handle to facilitate grasping and rotation of said tool during film pre-winding.

11. A prewind camera with means for limiting removal and reloading of film comprising:
   a main body having a film cartridge receiving compartment and a take-up spool disposed on opposing sides of a film exposing area;
   a rear door hingedly attached to said main body, said rear door being structured for swinging movement from a first closed position, wherein said film cartridge receiving compartment and said take-up spool are not accessible, to a second open position, wherein said film cartridge receiving compartment and said take-up spool are accessible;
   a front face structured to mate with said main body and said rear door to form a camera enclosure;
   said take-up spool having an outer end zone extending through said camera enclosure so as to be accessible exteriorly of said camera enclosure, wherein rotation of the take-up spool during pre-winding may be accomplished by grasping and rotating said outer end zone exteriorly of said camera enclosure;
   a latching member structured for sliding movement along a side wall of said main body from a first locking position, wherein said rear door is secured to said main body in said first closed position, to a second unlocking position, wherein said rear door may be swung into said second open position;
   said latching member having a pair of slots and a pair of hooks, each of said slots being structured to slidingly engage a guide pin disposed on said side wall of said main body so that said latching member may slide from said first locking position, wherein said guide pins are positioned at a lowermost end of said slots, to said second unlocking position, wherein said guide pins are positioned at an uppermost end of said slots, each of said latching member hooks being structured to matingly engage a corresponding hook extending out from said rear door when said latching member is in said first locking position, wherein sliding said latching member into said second unlocking position releases said rear door hooks from said latching member hooks, thereby permitting said rear door to be opened; and
   a tool structured to engage said lock mechanism and move said locking mechanism between said first locking position and said second unlocking position and to engage said outer end zone of said take-up spool to facilitate pre-winding of unexposed film from said film cartridge to said take-up spool.

12. The prewind camera of claim 11, wherein said latching member further includes a biasing mechanism structured to force said latching member into said first locking position from said second unlocking position.

13. The prewind camera of claim 12, wherein said biasing mechanism comprises a generally s-shaped, resilient biasing member seated above a generally horizontally disposed bar extending out from said side wall of said main body, said biasing member being structured and disposed to compress against said bar when said latching member is in said second unlocking position, thereby forcing said latching member back into said first locking position.

14. The prewind camera of claim 11, wherein said locking mechanism further comprises a pair of outwardly biased locking pins extending through and out from said side wall of said main body, said pins being structured and disposed for inward and outward movement from a first extended position, wherein said pins extend through a pair of corresponding holes in said latching member, thereby retaining said latching member in said first locking position, to a second depressed position, wherein said latching member may be slid downward to said second unlocking position, thereby permitting said rear door to be opened.

15. The prewind camera of claim 14, wherein said tool includes a pair of pins projecting out from one of its edges, said pins being structured for insertion into said holes in said latching member to depress said locking pins into said second depressed position.

16. The prewind camera of claim 15, wherein said tool includes a generally circular-shaped rim with at least one inwardly disposed tab extending out from its bottom face, said rim and tabs being structured to mate with a corresponding shaped structure disposed on an outer end of said outer end zone of said take-up spool.

17. The prewind camera of claim 16, wherein said tool further includes a handle to facilitate grasping and rotation of said tool during film pre-winding.

18. The prewind camera of claim 13, wherein said locking mechanism further comprises a pair of outwardly biased locking pins extending through and out from said side wall of said main body, said pins being structured and disposed for inward and outward movement from a first extended position, wherein said pills extend through a pair of corresponding holes in said latching member, thereby retaining said latching member in said first locking position, to a second depressed position, wherein said latching member may be slid downward to said second unlocking position, thereby permitting said rear door to be opened.

19. The prewind camera of claim 18, wherein said tool includes a pair of pins projecting out from one of its edges, said pins being structured for insertion into said holes in said latching member to depress said locking pins into said second depressed position.

20. The prewind camera of claim 19, wherein said tool includes a generally circular-shaped rim with at least one inwardly disposed tab extending out from its bottom face, said rim and tabs being structured to mate with a corresponding shaped structure disposed on an outer end of said outer end zone of said take-up spool.

21. The prewind camera of claim 20, wherein said tool further includes a handle to facilitate grasping and rotation of said tool during film pre-winding.

22. A method of loading and prewinding film in a camera having a main body with a take-up spool, a portion of which is accessible exteriorly of the camera, and a film cartridge receiving compartment disposed on opposing sides of a film exposing area, a rear door hingedly attached to the main body, a locking mechanism structured to prevent said rear door from being opened and a tool structured to engage the exteriorly accessible portion of the take-up spool and to unlock the rear door, said method comprising the steps of:

a. inserting a film cartridge having unexposed film into the film cartridge receiving compartment;
b. attaching a leader portion of the unexposed film to said take-up spool;
c. closing said rear door;
d. attaching said tool to said exteriorly accessible portion of said take-up spool;
e. rotating said tool to pre-wind unexposed film from the film cartridge to the take-up spool; and
f. removing said tool from said exteriorly accessible portion of said take-up spool.

23. The method of loading and prewinding film in a camera of claim 22 wherein the step of inserting a film cartridge having unexposed film into the film cartridge receiving compartment includes unlocking said rear door with said tool and opening said rear door.

24. The method of loading and prewinding film in a camera of claim 23 wherein said rear door is unlocked by depressing locking pins on said locking mechanism with said tool and sliding said locking mechanism to unlatch said rear door.

* * * * *